(No Model.)
C. H. WASHBURN.
LINE GUIDE FOR FISHING RODS.
No. 399,588. Patented Mar. 12, 1889.
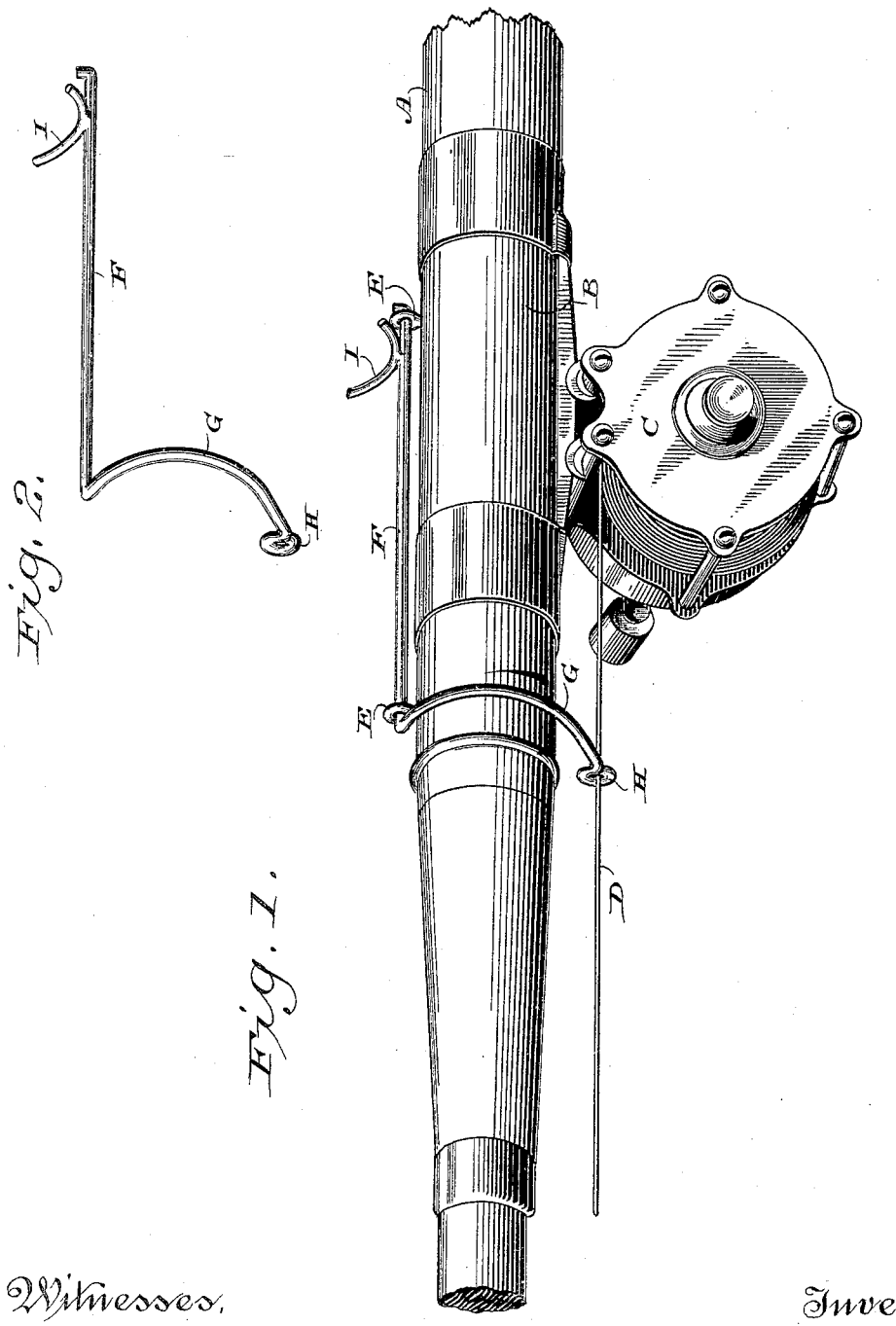

UNITED STATES PATENT OFFICE.

CHARLES H. WASHBURN, OF RACINE, WISCONSIN.

LINE-GUIDE FOR FISHING-RODS.

SPECIFICATION forming part of Letters Patent No. 399,588, dated March 12, 1889.

Application filed June 8, 1888. Serial No. 276,426. (No model.)

*To all whom it may concern:*

Be it known that I, CHARLES H. WASHBURN, of Racine, in the county of Racine and State of Wisconsin, have invented certain new and useful Improvements in Attachments for Fishing-Rods; and I do hereby declare that the following is a full, clear, and exact description thereof.

My invention relates to an attachment for fishing-rods, and has for its objects to prevent the bunching of a fishing-line on its reel while being wound up, as well as to prevent the slack of the line from doubling and winding back on said reel. These objects I attain by certain peculiarities of construction and combination of parts, to be hereinafter described with reference to the accompanying drawings, and subsequently claimed.

In the drawings, Figure 1 represents a perspective view of my device in connection with a fishing rod, line, and reel; and Fig. 2, a detail view of said device.

Referring by letter to the drawings, A represents a fishing-rod that in this instance is provided with a seat, B, for a reel, C, on which to wind a fishing-line, D, all of these parts being of the usual construction and relative arrangement.

Arranged at a suitable distance apart on the reel-seat B are eyes E, that serve as bearings for a lever, F, provided with a forward extension, G, that is preferably curved and bent at an angle to pass around and under the fishing-rod in front of the reel, the terminus of this lever-extension being preferably in the form of an eye, H, that serves as a guide for the fishing-line.

Arranged on the lever F, near its rear end, so as to be within easy reach of the angler, is a thumb-piece, I, and by means of this thumb-piece said lever may be readily rocked in its bearings to guide the fishing-line onto the reel when the latter is being wound, thereby preventing said line from bunching.

Another advantage of my device lies in the fact that the eye H in the curved forward extension, G, of the lever supports any slack that may come in the line near the reel, and consequently there is no liability of said line doubling and winding back on the reel when being run out.

Although I have shown and described my device as arranged in bearings attached to a reel-seat, it is obvious that in case a reel-seat is not employed the bearings for said device may be attached directly to the fishing-rod, the reel being likewise connected to said rod.

My device is designed to be manufactured and sold either in connection with a reel-seat or independent thereof, and being very simple and its advantages readily understood it can be easily attached to any fishing-rod.

Having thus fully described my invention, what I claim as new, and desire to secure by Letters Patent, is—

1. As a new article of manufacture, an attachment for a fishing-rod that comprises a rocking lever having its forward end bent at an angle to pass around under the rod and terminate in an eye, substantially as set forth.

2. As an improved article of manufacture, a reel-seat provided with bearings, a lever arranged to rock in the bearings and having its forward end terminating in an eye and bent at an angle to pass around under a rod to which said reel-seat may be attached, substantially as set forth.

3. The combination, with a fishing rod, reel, and line, of a rocking lever having its bearings on the rod and provided with an angular forward extension bent to pass around under the rod and terminate in an eye for engagement with the line, and a thumb-piece arranged on said lever, substantially as set forth.

In testimony that I claim the foregoing I have hereunto set my hand, at Racine, in the county of Racine and State of Wisconsin, in the presence of two witnesses.

CHARLES H. WASHBURN.

Witnesses:
 HENRY J. FOERTSCH,
 O. F. BOTSFORD.